United States Patent [19]

Vogel et al.

[11] 4,290,032

[45] Sep. 15, 1981

[54] LINEAR COMBUSTOR FOR GAS DYNAMIC LASER

[75] Inventors: Robert J. Vogel, Palm Beach Gardens, Fla.; Roger L. Wahl, Camarillo, Calif.

[73] Assignee: United Technologies Corporation, Hartford, Conn.

[21] Appl. No.: 58,715

[22] Filed: Jul. 18, 1979

[51] Int. Cl.$^3$ .............................................. H01S 3/08
[52] U.S. Cl. ......................... 331/94.5 D; 331/94.5 G
[58] Field of Search ..................... 331/94.5 D, 94.5 C, 331/94.5 G; 239/555

[56] References Cited

U.S. PATENT DOCUMENTS 3,602,432  8/1971  Mulready ............................ 239/555
3,819,321  6/1974  Witt ..................................... 239/555

*Primary Examiner*—William L. Sikes
*Assistant Examiner*—Leon Scott, Jr.
*Attorney, Agent, or Firm*—Jack N. McCarthy

[57] ABSTRACT

A gas dynamic laser device is formed having an elongated linear combustor having a trapezoidal cross-section. The combustion chamber is formed having a short front plate with two side plates extending rearwardly at an angle to an open end. A short flange extends outwardly from the free end of each side plate and an elongated plate extends forwardly from each short flange to a point located in front of each short plate. A plurality of ribs are placed along the length of said elongated linear combustor normal to the side plates. A primary injection device is placed in said short front plate between each adjacent pair of ribs and a secondary injection device is placed between each adjacent pair of ribs, alternating between side plates extending for the length of said combustor. The oxidizer is passed through the nozzle plates of the nozzle assembly for cooling it and passed through passages in the side plates of the combustion chamber for cooling them. The oxidizer is then passed to the primary injection device for mixing with fuel to be injected therein with a portion of the oxidizer being passed on to a secondary injection device for injection upstream toward said primary injection device.

5 Claims, 5 Drawing Figures

4,290,032

LINEAR COMBUSTOR FOR GAS DYNAMIC LASER

The invention herein described was made in the course of or under a contract with the Department of the Air Force.

BACKGROUND OF THE INVENTION

This invention relates to a bireactant gas dynamic laser and more specifically to the use of a linear combustor. Conventional gas dynamic laser systems generally incorporate a cylindrical combustor located at one end of a combustor distribution manifold and the hot gas must travel the length of the distribution manifold as it supplies each nozzle in a laser nozzle array. A cylindrical combustor is shown and claimed in U.S. Application Ser. No. 58,714 for COMBUSTOR FOR GAS DYNAMIC LASER by Robert G. Carroll et al, filed herewith, said application being commonly assigned with subject application. There is also a gas dynamic laser wherein a nozzle array is fed from the side. A construction of this type is shown in U.S. Pat. No. 4,161,285 and U.S. Pat. No. 4,215,823.

SUMMARY OF THE INVENTION

It is an object of this invention to provide a trapezoidal-shaped combustion chamber for reducing the size of the primary injector face to minimize heat loading and permit burning in a short distance. The use of this shape approaches a constant velocity combustion system which allows more stable and uniform combustion.

A further object of this invention is to provide a combustion chamber having integral structural members to restrain the internal pressure in the trapezoidal-shaped combustion chamber and reduce laser nozzle side wall deflections and nozzle stresses to an acceptable level.

Another object of this invention is to provide primary injection devices spaced along the small front side of the combustion chamber with a cooperating secondary injection device for each primary injection device, said secondary injection devices alternating on top and bottom sides of the trapezoidal-shaped combustion chamber along its length.

A further object of this invention is to provide a combustion chamber which provides a uniform hot gas profile at the exit of the chamber for optimum laser performance and uniform heat loading on the nozzle wafers.

DESCRIPTION OF THE PREFERRED EMBODIMENT

Figure 1:
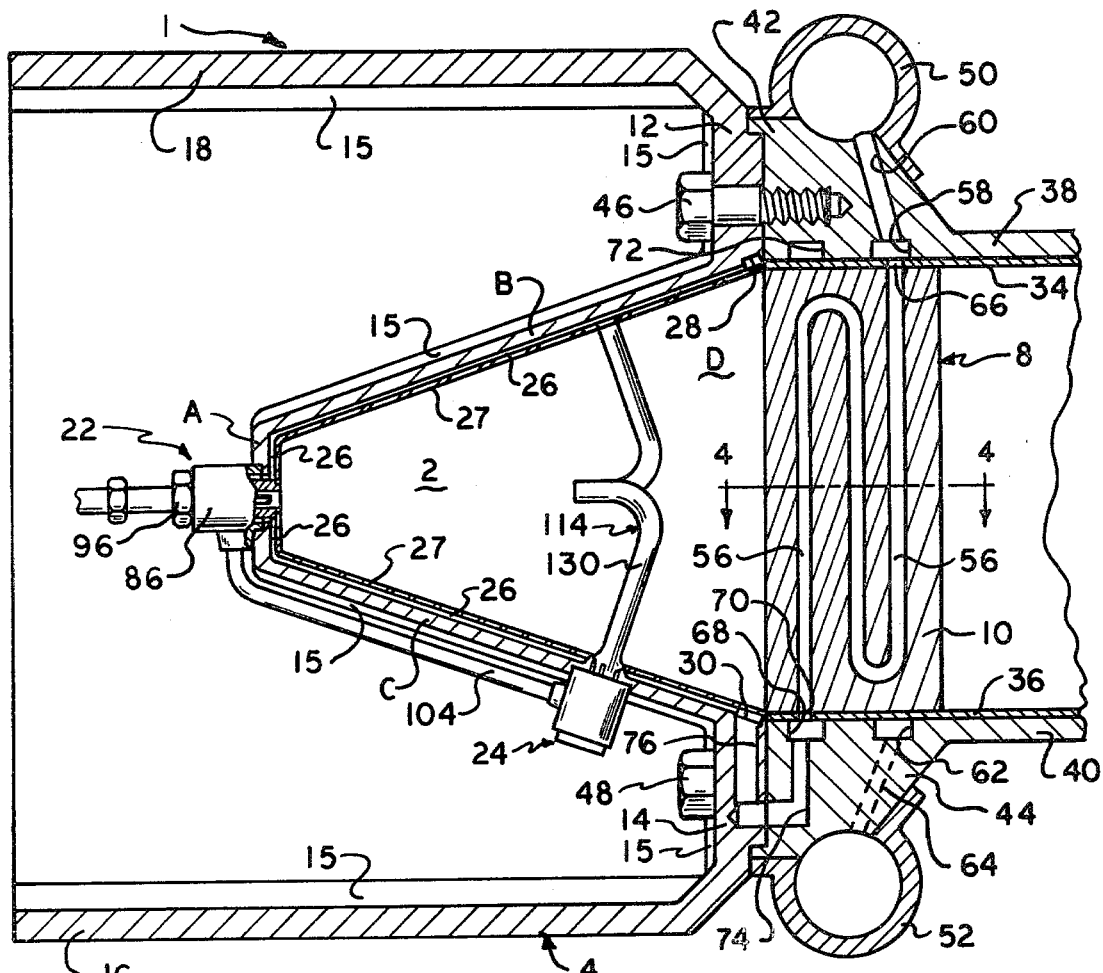
FIG. 1 is a sectional view taken through the linear combustor and downstream nozzles of a bireactant gas dynamic laser.
Figure 4:
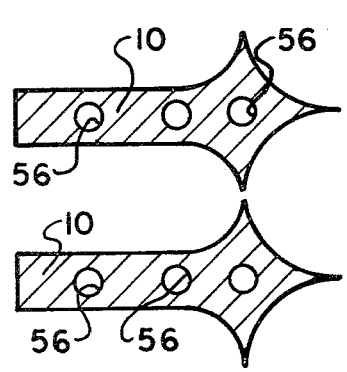
FIG. 4 is a sectional view taken along the line 4—4 of FIG. 1 through the nozzle assembly.
Figure 5:
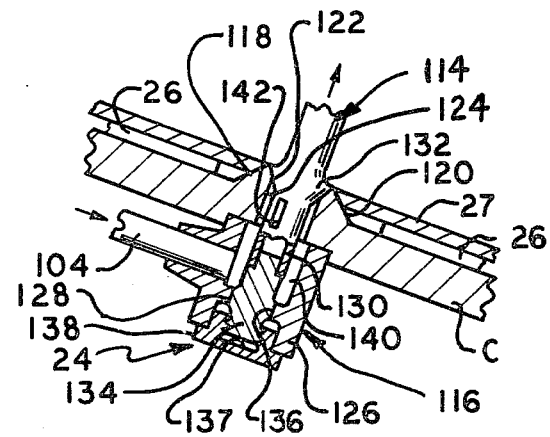
FIG. 5 is an enlarged sectional view of the connection of the secondary injection device to the linear combustor.
Figure 2:
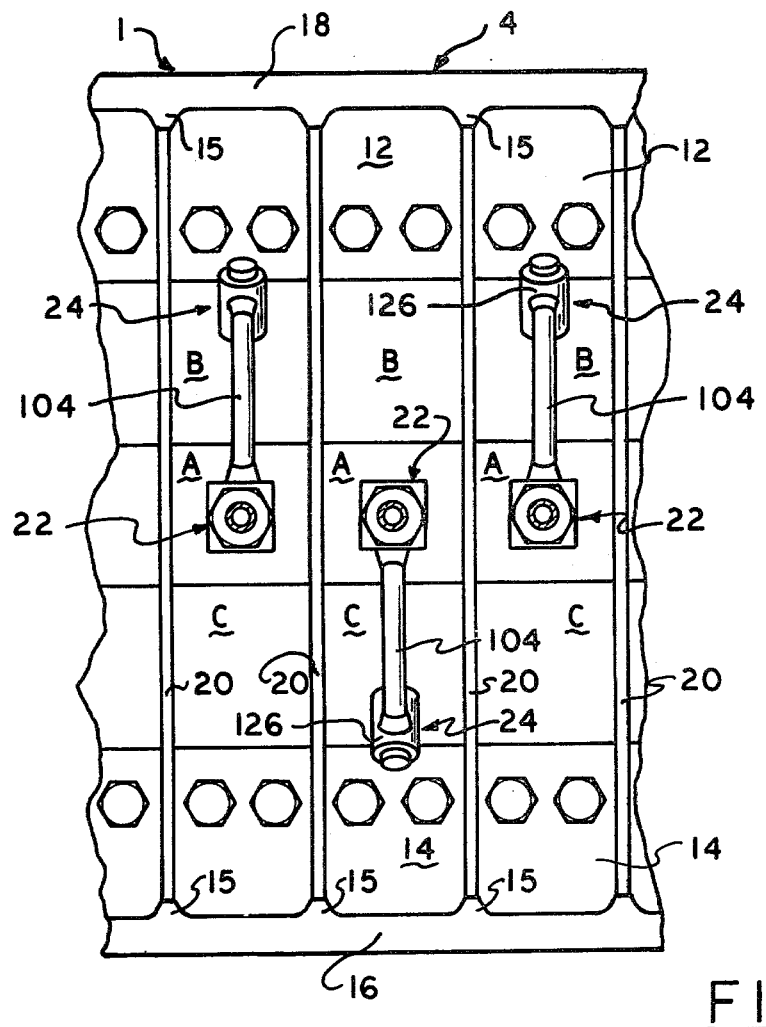
FIG. 2 is a front view of a portion of the linear combustor showing the positioning of the primary and secondary injection devices.
Figure 3:
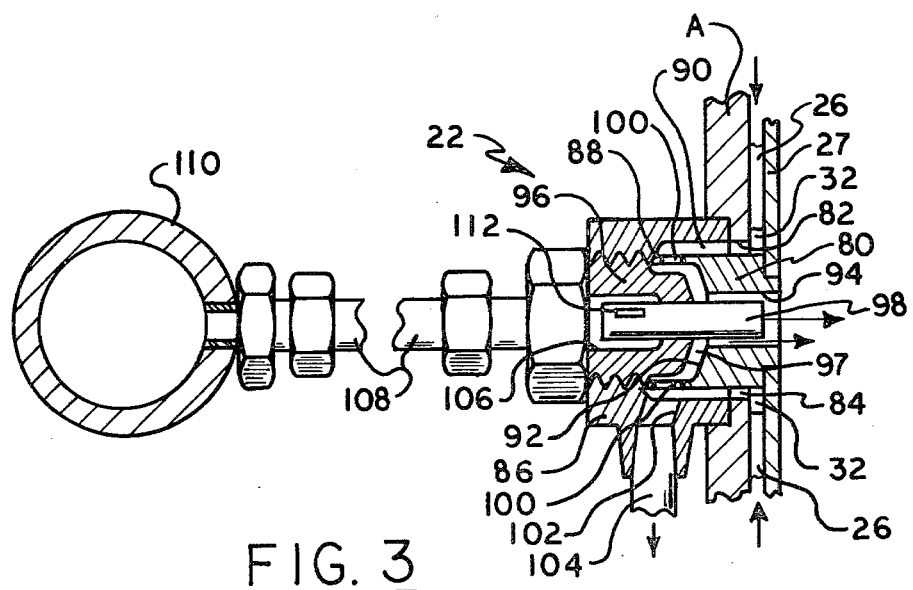
FIG. 3 is an enlarged view of the primary fuel and oxidizer injection device.

The bireactant gas dynamic laser 1 shown in FIGS. 1 and 2 includes a linear combustion chamber 2 formed in a linear combustor 4. The combustor 4 forms the linear combustion chamber 2 of a trapezoidal cross-section with a nozzle assembly 8, one short side A forming the front of the combustion chamber 2, while sides B and C extend away therefrom to open end D where the nozzle assembly 8 is fixedly positioned, said nozzle assembly 8 being constructed of a plurality of nozzle wafers 10. The use of nozzle wafers is shown in U.S. Pat. No. 3,602,432, and a linear combustor is shown in U.S. Pat. No. 3,819,321.

At the open end D, the combustor 4 has a short flange 12 extending upwardly from the end of side B and extending the full width of the linear combustion chamber 2. At the open end D, the combustor 4 has a short flange 14 extending downwardly from the end of side C and extending the full width of the linear combustion chamber 2. To structurally support the combustion chamber 2, a flat plate 16 extends forwardly from the end of flange 14 to a point forwardly of short side A and a flat plate 18 extends forwardly from the end of flange 12 to a point forwardly of short side A, said plates 16 and 18 being of the same length, and extending the full width of the combustion chamber 2. Webs 20 are spaced along the full width of the combustion chamber 2 and welded to the outside of sides A, B and C of the combustion chamber 2, short flanges 12 and 14, and flat plates 16 and 18 of the combustor 4. Sides B and C of combustion chamber 2, short flanges 12 and 14, and flat plates 16 and 18, have aligned elongated projections 15 onto which the webs 20 are welded. This front structure limits stresses in the walls of the combustion chamber 2 and nozzle assembly 8 to acceptable levels. The webs may be spaced at different desired intervals.

A primary injection device 22 is placed in the center of front side A of the combustion chamber 2 between each of the webs 20. A secondary injection device 24, one for each primary injection device 22, is placed between each of the webs 20 on alternate sides B and C along the width of the combustion chamber 2 (see FIG. 2).

The inner surfaces of the sides B and C have spaced grooves 26 extending for their length. These grooves 26 are connected to an elongated groove 28 in side B, and extending for its width where it connects to short flange 12, and connected to an elongated groove 30 in side C, and extending for its width where it connects to short flange 14. Grooves 26 extend to front side A where they continue along side A to a point adjacent the location of the primary injection devices 20. A liner 27 is fixed to the sides B, C and A and forms a manifold with groove 28 and groove 30, and forms a manifold 32 with front side A between the points where the grooves 26 end. The liner 27 forms lengthwise cooling passages with the grooves 26. The number of grooves 26 desired depends on the specific laser installation. The primary injection devices 22 are connected to front side A where the elongated center manifold 32 is located.

Nozzle assembly 8 has its nozzle wafers 10 fixed between liner plates 34 and 36 located on the inner surface of plates 38 and 40, respectively. Plate 38 has an upwardly extending elongated flange 42 for engagement with short flange 12, and plate 40 has a downwardly extending elongated flange 44 for engagement with short flange 14. Upwardly extending elongated flange 42 is fixedly held against short flange 12 by bolts 46 and downwardly extending elongated flange 44 is held against short flange 14 by bolts 48. Side plates (not shown) enclose the ends of walls A, B and C and plates 38 and 40. An oxidizer manifold 50 extends along and is fixed to the free end of the elongated flange 42 and an oxidizer manifold 52 extends along and is fixed to the free end of flange 44. Oxidizer supply means is connected to the ends of the manifolds 50 and 52.

Nozzle wafers 10 each have an internal passage 56 for cooling and through which the oxidizer is passed. Each passage 56 makes three passes along the length of the nozzle wafer with alternating wafers starting at different ends of the wafer. The nozzle wafer 10, shown in FIG. 1, and alternate nozzle wafers 10, are fed from their top side from a manifold formed by an elongated groove 58 along the inner side of elongated flange 42 and liner plate 34. An opening 66 is placed in the liner plate 34 where necessary to connect a passage 56 to the groove 58. This manifold is fed by a plurality of passageways 60 extending to oxidizer manifold 50. The alternate nozzle wafers 10, alternate to the ones referred to above (which included the nozzle wafer 10 shown in FIG. 1), are fed from their bottom side from a manifold formed by an elongated groove 62 along the inner side of elongated flange 42 and liner plate 36. An opening, not shown (similar to opening 66) is placed in the liner plate 36 where necessary to connect a passage 56 to the groove 62. This manifold is fed by a plurality of passageways 64 extending to oxidizer manifold 52.

The nozzle wafer 10 shown in FIG. 1, and alternate nozzle wafers 10, direct their flow from passage 56 into a manifold formed by an elongated groove 68 (located adjacent elongated groove 62) and liner plate 36. An opening 70 is placed in the liner plate 36 where necessary to connect a passage 56 to the groove 68. The alternate nozzle wafers 10, alternate to the ones referred to above (which included the nozzle wafer 10 shown in FIG. 1) direct their flow from passage 56 into a manifold formed by an elongated groove 72 (located adjacent elongated groove 58) and liner plate 34. An opening (not shown, similar to opening 66) is placed in the liner plate 34 where necessary to connect the passage 56 to the groove 72.

Elongated groove 68 is connected to elongated groove 30 by cooperating passages 74 and 76, located in elongated flange 44 and short flange 14, respectively. Elongated groove 72 is connected to elongated groove 28 by similar cooperating passages (not shown) located in elongated flange 42 and short flange 12.

Each primary injection device 22 includes a cylindrical center portion 80 which extends through an opening 82 in short side A of the linear combustion chamber 2 and is fixed to the liner 27. While this is shown by having a projecting end of the cylindrical center portion 80 extend into liner 27, other means can be used. An annular opening 84 is provided between the opening 82 and cylindrical center portion 80. An outer extending cover 86 is positioned over the free end of the cylindrical center portion 80 and is fixed thereto at 88 at approximately the center of the outer extending cover 86. An annular opening 90 is formed between the cylindrical center portion 80 and outer extending cover 86 and is connected to annular opening 84.

The free end of the cylindrical center portion 80 has a countersunk portion 92 and a nozzle opening 94 which connects the bottom of the countersunk portion 92 through the projecting end of the cylindrical center portion 80 into the liner 27. A fuel nozzle 96 is threaded into an opening in the outer extending cover 86, said fuel nozzle having a fuel tube 98 fixed thereto and extending into the nozzle opening 94, leaving an annular space therebetween. The bottom of the fuel nozzle 96 is spaced from the bottom of the countersunk portion 92, leaving a chamber 97 connected to the annular space between the fuel tube 98 and nozzle opening 94. This chamber 97 is connected to the annular opening 90 by a plurality of holes 100. This chamber 97 is also connected to the exterior of the outer extending cover 86 by an opening 102. A conduit 104 is connected to opening 102 for delivering an oxidizer to a cooperating secondary injection device 24.

Fuel nozzle 96 has a countersunk portion 106 extending from its outer end for connection to a conduit 108 which delivers fuel thereto from a fuel manifold 110. Conventional connectors connect these components. The fuel tube 98 also extends into the countersunk portion 106 leaving an annular opening therearound for receiving fuel. Three tangential slots 112 are positioned around the fuel tube 98 so as to inject fuel tangentially into the fuel tube 98 to obtain the proper injection spray with added oxidizer into the combustion chamber 2 from nozzle opening 94. Each secondary injection device 24 includes an injector nozzle 114 extending into said combustion chamber 2 with its outlet aligned with the nozzle opening 94 of its cooperating primary injection device 22 and a holding and positioning housing means 116. Each respective side B and C of combustion chamber 2 where it receives a secondary injection device 24 is specifically adapted to receive such a device. The inner surface has an annular projection 118 having a tapered outer surface 120 and a tapered inner surface 122. The liner 27 is fixed to the inner edge of the tapered outer surface 120. The grooves 26 end a short distance before they reach the tapered surface 120 so that the fluid can flow around the annular projection 118.

An opening 124 extends through the tapered inner surface 122 of the annular projection 118 and extends to the outer surface of its respective side. A countersunk portion extends around the opening 124 on the outer surface. Cylindrical housing means 126 is positioned in said countersunk portion and fixed thereto by any means desired, such as by brazing. The inner portion of said housing means 126 has an inwardly extending flange 128. Each injector nozzle 114 includes a nozzle tube 130 which extends into the combustion chamber 2 and has a radius permitting it to turn toward the primary injection device 22. The other end of the injector nozzle 114 has a tapered flange 132 therearound which engages the tapered inner surface 122. The free end of the tube 130 has a solid end 134 which is fixed thereto and closes the tube. Solid end 134 has an outwardly extending flange 136 for engaging the inwardly extending flange 128 of housing means 126. The outer end of the solid end 134 is threaded and a nut 138 having an internal threaded opening 137 for engaging the threaded end of solid end 134 can be tightened into position to fix the injector nozzle 114 in place when it has been properly aligned. It can be seen that the nut 138 will pull the tapered flange 132 of an injector nozzle 114 against the tapered inner surface 122 as it is tightened against the bottom of housing means 126.

An annular chamber 140 is provided between the housing means 126 and the free end of the tube 130 and solid end 134. This chamber communicates with an annular space between the free end of the tube 130 and opening 124 in the respective side of the combustion chamber in which the secondary injection device 24 is mounted. A conduit 104 from its cooperating primary injection device 22 is connected to cylindrical housing means 126 and delivers an oxidizer to the chamber 140. Three tangential slots 142 are positioned around the tube 130 and open into the annular space between the free end of the tube 130 and opening 124. These slots provide the proper injection configuration of the oxidizer leaving the nozzle tube 130 of injector nozzle 114.

It can be seen that during operation an oxidizer from manifold 50 is delivered through passageways 60 to elongated groove 58 where it is delivered by openings 66 to passages 56 in alternate nozzle wafers 10 of the nozzle assembly 8. From these passages 56 the oxidizer passes to elongated groove 68 through openings 70; from groove 68 the oxidizer passes through passages 74 and 76 to elongated groove 30 and the ends of the grooves 26 of side C. At the same time, the oxidizer from manifold 52 is delivered through passageways 64 to elongated groove 62 where it is delivered to passages 56 in the remaining alternate nozzle wafers 10 of the nozzle assembly. From these passages 56 the oxidizer passes to elongated groove 72; from groove 72 the oxidizer passes through passages to elongated groove 28 and the ends of grooves 26 of side B.

The oxidizer then flows from the elongated grooves 28 and 30 along the sides B and C, respectively, flowing around the annular projections 118 where they appear, to the elongated center manifold 32. From elongated center manifold 32, the oxidizer flows through each annular opening 84 into each annular opening 90 of each primary injection device 22. From the annular opening 90, a portion of the flow goes through holes 100 into chamber 97 where it passes through the annular space between the fuel tube 98 and nozzle opening 94 into the combustion chamber 2; the remainder of the oxidizer is directed through opening 102 into its cooperating conduit 104.

Fuel is delivered from manifold 110 to each primary injection device 22 by conduit 108 where it is directed into each countersunk portion 109 and through tangential slots 112 into fuel tube 98. The swirling fuel through fuel tube 98 is injected into the oxidizer exiting around the fuel tube 98 in nozzle opening 94 to achieve a desired spray configuration entering the combustion chamber.

The remainder of the oxidizer passing through conduit 104 of each primary injection device 22 passes to its cooperating secondary injection device 24. Here the oxidizer passes to annular chamber 140 where it is directed to the annular space between the free end of the tube 130 and opening 124. At this point, the oxidizer is injected through tangential slots 142 into the nozzle tube 130. The oxidizer then passes through the tube 130 until it exits out the nozzle end thereof, said nozzle end being axially aligned with the nozzle opening 94 of its cooperating primary injection device 22. Nozzle openings 94 extend along the center line of the short side A and the nozzle end of the tube 130 is located at the center line of the combustion chamber 2.

Four torch igniters (not shown) provide rapid reliable ignition of the combustion chamber reactants. One is located at each end of the combustor with two equally spaced along the length thereof. The torch igniter used is of the type shown in U.S. Pat. No. 4,002,431.

This combustor is divided into two basic zones; a primary zone and a secondary zone. In a construction built and tested, the fuel was a Benzonitrile fuel (BZN) and the oxidizer was sufficient nitrous oxide ($N_2O$) to create a readily ignitable, hot, soot-free flame through each primary injection device 22. An equivalence ratio used was 0.4 to insure highly flammable, yet soot-free combustion. The oxidizer-to-fuel momentum ratio was kept high to insure complete shattering of the fuel droplets and mixing prior to combustion. The hot reaction products from the four torch igniters reacted with the primary gases to initiate local decomposition of the $N_2O$. The torch igniters were left on long enough to achieve self-sustaining conditions, but were turned off before steady-state conditions were achieved. Two of the torch igniters, the ones at each end of the combustor, fired parallel to the primary injector face and impinged directly on the adjacent primary injection flow and the two other torch igniters equally spaced along the combustor 4, were inclined 15° to the axial center line of the primary injector face so that the igniter flame impinged on the flow of the primary injectors. The remainder of the $N_2O$ was injected through each secondary injection device 24 into the hot primary gases in the secondary zone. The counter-flow arrangement and tangential swirler slots were used to inject the secondary flow as a hollow cone to achieve complete reaction zone coverage and therefore, complete secondary decomposition. The spacing between the primary injection nozzle opening 94 and the end of the nozzle tube 130 was made 3.9 inches (9.91 centimeters) to insure complete primary reaction before interaction with the secondary flow. The spacing between the end of the nozzle tube 130 and the front edge of the nozzle wafers 10 was made approximately 2.6 inches (6.60 centimeters). The web spacing was made 2 inches (5.08 centimeters). The side plates flared outwardly at an angle of 18° 43' to the center line of the combustion chamber. The nozzle assembly was 5.9 inches (14.99 centimeters) high with the chord of the nozzle wafers being approximately 1.15 inches (2.92 centimeters) long.

We claim:

1. In a gas dynamic laser device; an elongated linear combustor; said combustor having a combustion chamber of trapezoidal cross-section with an elongated open end, said chamber being formed by a short front plate and two side plates extending rearwardly at an outwardly extending angle, each side plate having a rear end at the elongated open end of said combustion chamber; said combustor having a short flange extending outwardly from the rear end of each side plate, each short flange having a first end away from its cooperating side plate; an elongated plate extending forwardly from the first end of each short flange to a point located in front of said short plate; a plurality of ribs spaced adjacent one another along said elongated linear combustor normal to the side plates of the combustion chamber; said ribs being fixed to the short front plate, two side plates, short flanges, and elongated plates for supporting said combustion chamber.

2. In a device as set forth in claim 1, primary injection devices for injecting a combustible mixture into said combustion chamber being fixed to said short front plate between said ribs; secondary injection devices for injecting an oxidizer into said combustion chamber being fixed to a side plate; said secondary injection devices alternating between side plates along the combustor.

3. In a device as set forth in claim 2, each primary injection device includes a nozzle opening located along the center of the short front plate; each secondary injection device includes a nozzle tube having a nozzle end located at the center of the combustion chamber between the side plates; each nozzle end being aligned with a nozzle opening.

4. In a device as set forth in claim 2, one primary injection device and one secondary injection device being located between each pair of adjacent ribs; each secondary injection device having a nozzle end projecting into said combustion chamber, said nozzle tubes extending inwardly from said side plates and alternating between said side plates along the combustion chamber.

5. In a device as set forth in claim 1, a nozzle assembly extending along the open end of said combustion chamber; said nozzle assembly comprising a plurality of nozzle wafers; said wafers being fixed to an upper and lower plate means; said upper plate means being fixed to one short flange and the lower plate means being fixed to the other short flange.

* * * * *